US009829171B2

(12) United States Patent
Puente et al.

(10) Patent No.: US 9,829,171 B2
(45) Date of Patent: Nov. 28, 2017

(54) MOTOR VEHICLE LIGHTING DEVICE COMPONENT COMPRISING A BEARING ELEMENT AND A DAMPER

(71) Applicant: Valeo Vision, Bobigny (FR)

(72) Inventors: Jean-Claude Puente, Livry Gargan (FR); Christine Roucoules, Deuil la Barre (FR); Vanesa Sanchez, Bois Colombes (FR); Stephan Sommerschuh, Paris (FR)

(73) Assignee: Valeo Vision, Bobigny (FR)

( * ) Notice: Subject to any disclaimer, the term of this patent is extended or adjusted under 35 U.S.C. 154(b) by 251 days.

(21) Appl. No.: 14/688,404

(22) Filed: Apr. 16, 2015

(65) Prior Publication Data
US 2015/0300591 A1    Oct. 22, 2015

(30) Foreign Application Priority Data

Apr. 18, 2014    (FR) ..................................... 14 53565

(51) Int. Cl.
| F21S 8/10 | (2006.01) |
| B60Q 1/04 | (2006.01) |
| B60Q 1/076 | (2006.01) |
| F21V 17/00 | (2006.01) |

(52) U.S. Cl.
CPC ............ *F21S 48/31* (2013.01); *B60Q 1/0491* (2013.01); *B60Q 1/076* (2013.01); *F21V 17/007* (2013.01)

(58) Field of Classification Search
CPC ....... B60Q 1/0491; B60Q 1/076; F21S 48/31; F21V 17/007
See application file for complete search history.

(56) References Cited

U.S. PATENT DOCUMENTS

| 3,999,058 A * | 12/1976 | Puyplat ................ B60Q 1/1415 362/386 |
| 6,871,989 B2 | 3/2005 | Nakazawa et al. |
| 8,360,625 B2 | 1/2013 | Shibata et al. |
| 2003/0117810 A1 | 6/2003 | Nakazawa et al. |
| 2011/0063866 A1 | 3/2011 | Shibata et al. |

FOREIGN PATENT DOCUMENTS

| EP | 2298602 A2 | 3/2011 |
| EP | 2444723 A1 | 4/2012 |
| FR | 2925419 A1 | 6/2009 |

* cited by examiner

*Primary Examiner* — Stephen F Husar
(74) *Attorney, Agent, or Firm* — Jacox, Meckstroth & Jenkins

(57) ABSTRACT

A vehicle lighting device component that comprises a component body having at least one fastening means for fastening the component. The device has a bearing element secured to the body that is separate from the fastening means, and comprises a bearing surface. The vehicle lighting device component is intended to bear against the bearing surface when it is fastened. The bearing element and the body are designed such that the bearing surface is able to move with respect to the body. The device also comprises a damper that is able to damp a movement of the body to move it toward or away from the bearing surface.

17 Claims, 5 Drawing Sheets

MOTOR VEHICLE LIGHTING DEVICE COMPONENT COMPRISING A BEARING ELEMENT AND A DAMPER

CROSS-REFERENCE TO RELATED APPLICATIONS

This application claims priority to the French application 1453565 filed Apr. 18, 2014, which application is incorporated herein by reference and made a part hereof.

BACKGROUND OF THE INVENTION

1. Field of the Invention

The present invention relates to a vehicle lighting device component, an assembly containing this component, or a vehicle lighting device containing this component or this assembly.

2. Description of the Related Art

Vehicle lighting devices may be required to comprise components which, once fixed in place, have a significant overhang or support a substantial load. It follows that when they are mounted on a vehicle and the latter is subjected to significant variations in load, the vibrations brought about at the component and its fastening means can result in these breaking.

This is the case for example for mounting plates that support one or more optical modules. These modules are fairly heavy especially if they comprise lenses. The mounting plates are generally supported by fastening points, often three thereof. The vibrations of the vehicle are transmitted to these fastening points and damage them.

It has been proposed to add to these components an element that allows the component to bear against a support, such as a base plate carriage, the latter being able to slide in a slideway. However, it is necessary to have a clearance between the carriage and the slideway in order that the movement can occur. The drawback with these devices is that jolts then take place in the slideway. This results in strong vibrations in the component, and these can degrade the component itself and its fastening points. They can also degrade the elements carried by this component, for example an optical module carried by a mounting plate.

SUMMARY OF THE INVENTION

The invention aims to propose a vehicle lighting device component that aims to reduce the impact of variations in load to which this component is subjected.

A subject of the invention is thus a vehicle lighting device component comprising:

a component body comprising at least one fastening means for fastening the component, a bearing element secured to the body, separate from the means, and comprising a bearing surface, the component being intended to bear against the bearing surface when it is fastened by way of its fastening means, and the bearing element and the body being designed such that the bearing surface is able to move with respect to the body, a damper designed so as to be able to damp a movement of the body, this movement of the body tending to move it toward or away from the bearing surface.

Thus, once the lighting device has been mounted in the vehicle, said component will bear against the bearing surface, making it possible to support its weight and the overhang. When the vehicle is subjected to variations in load, for example in the event of braking, the body will tend to move towards the bearing surface, or, for example in the event of acceleration, to move away therefrom. The damper will damp these variations such that the variations to which the bearing surface is subjected are lessened. Thus, the component, its fasteners and the elements which are connected thereto will have a longer service life.

According to one embodiment of the invention, the component comprises a guide means that is able to guide the movement of the component in at least one preferred direction. This makes it possible to provide a non-fixed bearing point and to channel a movement of the component in a direction that is for example less harmful to the lighting function of the device comprising the component.

For example, when the device is a high mounted stop light, also referred to as a CHMSL (Centered High Mounted Stop Light), the housing of the latter or its optical screens are disposed transversely with respect to the longitudinal axis of the vehicle and can be fairly long. Their ends can be caused to vibrate, for example with respect to the middle, toward the rear and the front of the vehicle. It may be useful to guide this movement in a longitudinal direction of the vehicle in order that the signaling function remains in an appropriate orientation.

When the device is a headlamp and the component body is the mounting plate for supporting the optical module of this component body, the guide means is able to guide the movement of the component in a longitudinal direction. In this case, the longitudinal direction corresponds to a movement from the rear of the headlamp to the front. This allows the mounting plate to tilt up or down, and thus allows horizontal adjustment of the optical module.

The component according to the invention may also comprise one or more of the following features:

the bearing element and the bearing surface are designed such that the component can move as one with the bearing surface in the preferred direction, thereby aiding the sliding of the bearing surface when the component moves;

the damper is secured on one side to the bearing surface and on the other to the component body; this arrangement is easier to implement in order to damp the movement of the component body;

the elastic means is preloaded; this makes it possible to maintain permanent contact between the bearing surface and its support; moreover, even if a variation in load would be sufficient for the bearing surface to lose contact with the support, this movement will nevertheless be absorbed and the vibrations will be reduced;

the additional elastic means is a spring;

the elastic means is a spring; this means is easier to implement; it is also possible to use any other elastic means, such as a foam or rubber;

the damper comprises two elements that slide one in the other, one being secured to the body and the other being secured to the bearing element, the elastic means being arranged between two parts of these elements so as to deform as a result of the movement of these elements with respect to one another when the body tends to move toward or away from the bearing surface; this arrangement is simple to implement in order to have good damping of this movement toward or away from the bearing surface, and this of variations in load on the component;

the sliding elements may be a cylinder body and a piston inside the cylinder body, the elastic means being able to be a spring or a gas trapped in the cylinder body, between the bottom of the latter and the piston; a hydropneumatic system that makes it possible to damp the movement of these elements with respect to one another may also be envisioned;

the element secured to the bearing element is a shaft and the element secured to the component body comprises an orifice, the shaft passing through the orifice, the elastic means being fastened on one side to the shaft and on the other to the component body so as to deform when the shaft moves through the orifice;

the bearing element comprises the shaft, the latter being connected to the bearing surface and to the component body; thus, the bearing element and the damper are produced in a compact manner with a common shaft;

the orifice is formed in a part of the component body; in this case, there is also a saving on the number of components, the component body forming a part of the damper;

the component comprises a bearing which is fastened to the shaft and against which the elastic means bears; this is a simple embodiment; when the elastic means is a coil spring, it may be arranged around this shaft, thereby improving ease of production and compactness;

the bearing element comprises a transverse portion that bears the bearing surface and is fastened to one end of the shaft, the transverse portion protruding from each side of the shaft so as to be able to engage with a rail or slideway;

the transverse portion is cylindrical, the axis of the cylinder being perpendicular to that of the shaft; this thus improves the sliding of the bearing surface, the size of the contact surface in the direction of the preferred direction being reduced;

the transverse portion is cylindrical and has an oval, elliptical or circular cross section, this thus further improving the sliding of the bearing surface; these examples are not limiting and more generally the transverse portion may have a cross section such that the bearing surface is tangent to a plane along a line;

the transverse portion comprises two elements which slide one in the other, one being connected to the shaft and the other being free, an additional elastic means being arranged between two parts of these elements so as to deform as a result of the movement of these elements with respect to one another;

the transverse portion comprises:
a sleeve having a cylindrical orifice,
a slide sliding inside the sleeve,
a head fastened to the end of the slide and outside the sleeve,
an additional elastic means connected on one side to the head and on the other to the sleeve;

the head is a spherical cap; this aids its guidance against the complementary guide means;

the head and/or the bearing surface are made of a material having a low coefficient of friction, for example polytetrafluoroethylene (PTFE);

the component body is a screen made of a transparent and/or translucent material; the invention can thus be applied to long optical components, such as those present in high mounted stop lights;

the component body is the mounting plate for supporting at least one optical module.

In a general manner, the component according to the invention may comprise an additional damper designed so as to be able to damp another movement of the body, in a direction different than that of the movement of the body that tends to move it toward or away from the bearing surface.

This additional damper may comprise at least one additional elastic means that is able to deform when the body moves with the other movement.

The invention also covers an assembly comprising an optical module mounted on a component according to the invention, the component body being the mounting plate for supporting the optical module.

The invention also covers an assembly comprising at least one optical module mounted on a component according to the invention, the component body being the mounting plate for supporting the optical module, wherein:

the element secured to the component body and comprising an orifice is a bearing for the mounting plate, the shaft has a first end connected to the bearing surface and a second end, the ends being located on either side of the orifice, the optical module is mounted so as to rotate on the second end of the shaft such that the optical module can turn about the shaft with respect to the mounting plate.

Thus, in a compact manner, the shaft of the bearing element is also the rotary shaft of the optical module. This is particularly advantageous when the optical module is able to turn horizontally, for example in order to follow the curves of bends.

The invention also covers a lighting device comprising:
a housing closed by a transparent outer lens and thus defining a chamber,
a component or an assembly according to the invention, inside the chamber, the component comprising a guide means that is able to guide the movement of the component in at least one preferred direction,
wherein the housing comprises a guide means which is complementary to the guide means for the component and is designed to allow the component to move in at least one preferred direction.

This makes it possible to guide the component more easily in the lighting device in the preferred direction.

According to an embodiment that is easy to implement, the complementary guide means is a slideway inside which the guide means for the component is mounted and is able to slide in the preferred direction therein.

These guide means may be two "L"-shaped elements that are fastened to a wall of the housing. A first arm of the "L" extends from the wall of the housing, the other from this first arm. This is simple to produce. For example, when the slideway is at the bottom, the "L" extends upside-down, from the bottom of the casing, the vertical arm extending from this bottom.

The guide means may be formed integrally in one piece with the housing.

The lighting device may be a high mounted stop light comprising a screen, the component body being this screen, the screen being made of a transparent and/or translucent material.

The invention also covers a component according to the invention, wherein the component body is a housing for a vehicle lighting device, in particular a high mounted stop light, the housing being intended to be closed by a transparent outer lens in order thus to define a chamber, the bearing element being outside the chamber. This makes it possible to have a bearing point on an element of the vehicle once the housing is mounted in this vehicle. The invention also covers a lighting device comprising such a component, this lighting device being for example a high mounted stop light. This is advantageous since, on account of its length, a high mounted stop light can also be subjected to strong vibrations with respect to the bodywork of the vehicle.

The invention also covers a lighting device comprising:
a housing,
a mounting plate for supporting an optical module,
a component according to the invention, in which the component body is an adjusting rod comprising at one end a fastening point for fastening to the mounting plate and at the other a fastening point for fastening to the housing of the lighting device,
the bearing element being secured to the adjusting rod and the bearing surface bearing directly or indirectly against a wall of the housing.

This also makes it possible to damp the vibrations on this rod, in particular when the latter is long and thus has a significant overhang.

BRIEF DESCRIPTION OF THE ACCOMPANYING DRAWINGS

The invention will be understood better from reading the following description, which is given purely by way of example and with reference to the drawings, in which.

DETAILED DESCRIPTION OF THE PREFERRED EMBODIMENTS

Figure 1:
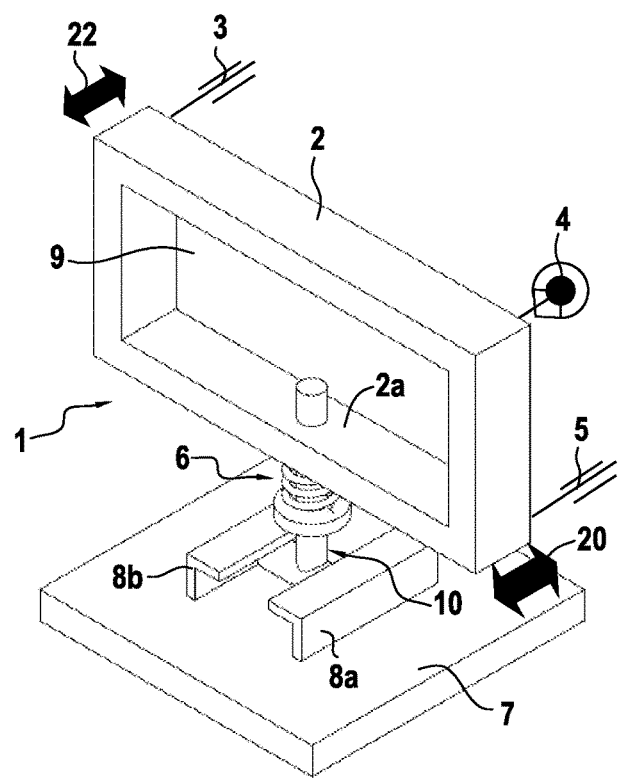
FIG. 1 is a perspective view of a component according to the invention, in a first state.
Figure 2:
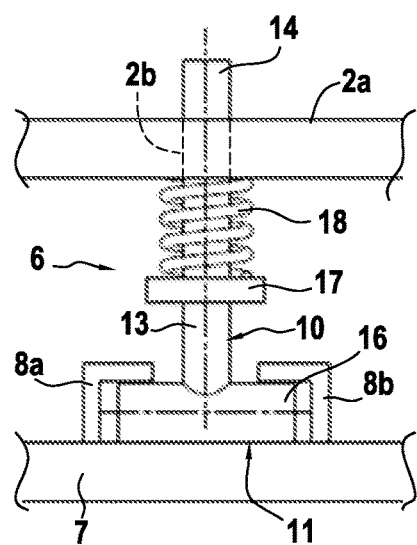
FIG. 2 shows an enlarged front view of a part of FIG. 1, in particular of the damper.

FIG. 1 and FIG. 2 illustrate a vehicle lighting device component 1 according to the invention, comprising:

a component body 2 comprising three fastening means 3, 4 and 5 for fastening the component body 2, a bearing element 10 secured to the component body 2, separate from the three fastening means 3, 4, 5, and comprising a bearing surface 11, the vehicle lighting device component 1 being intended to bear against the bearing surface 11 when it is fastened by way of its fastening means 3, 4, 5, and the bearing element 10 and the component body 2 being designed such that the bearing surface is able to move with respect to the component body 2, a damper 6 designed so as to be able to damp a movement of the component body 2, this movement of the component body 2 tending to move it toward or away from the bearing surface 11.

Figure 9:
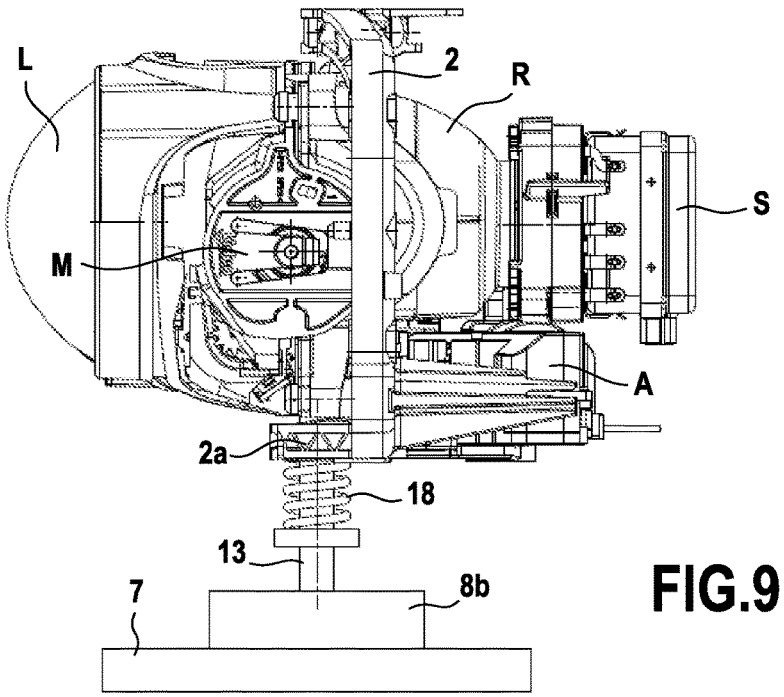
FIG. 9 shows a side view of an embodiment according to the invention.
Figure 10:
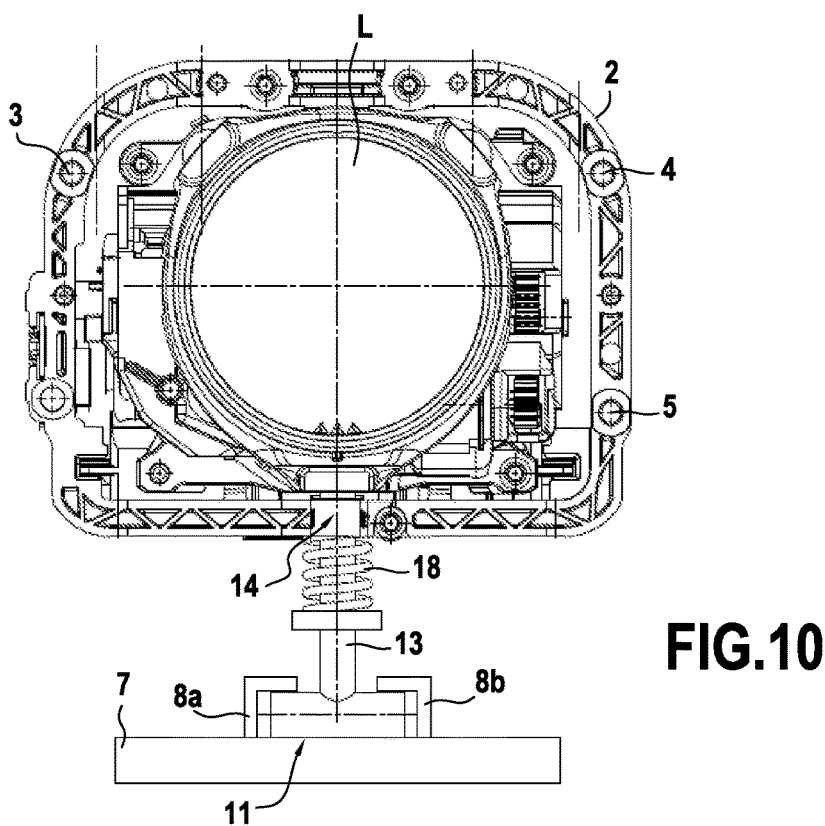
FIG. 10 is a front view of the embodiment illustrated in FIG. 8.

In the example illustrated, the component body is a mounting plate 2 intended to receive an optical module. It has in particular the form of a frame, the optical module being fastened to the frame in particular by passing through the latter by way of an opening 9, as illustrated in FIGS. 9 and 10. As will be explained later in the text, this embodiment is not limiting.

The vehicle lighting device component 1 comprises a guide means 16 that is able to guide the movement of the vehicle lighting device component 1 of the invention in at least one preferred direction. In this case, this is the longitudinal direction parallel to that of the vehicle when the vehicle lighting device component 1 is mounted in the lighting device, which is itself mounted in the vehicle.

The vehicle lighting device component 1 is comprised here in a lighting device comprising a housing closed by a transparent outer lens (not shown), thus defining a chamber. The bearing surface 11 is in contact with the wall of the housing bottom 7. The vehicle lighting device component 1 thus bears against the housing bottom 7 with the bearing surface 11 via the bearing element 10.

The housing bottom 7 comprises, inside the chamber, a guide means 8a, 8b which is complementary to the guide means 16 for the vehicle lighting device component 1 and is arranged so as to allow the vehicle lighting device component 1 to move in the preferred direction. In this example, the complementary guide means is formed by two rails 8a and 8b that form a slideway, inside which the bearing element 10 can slide.

The bearing element 10 comprises a shaft 13 that is secured on one side to the mounting plate 2 and on the other to a transverse bar 16. The transverse bar 16 bears the bearing surface 11 and protrudes from each side of the shaft 13, thereby forming a "T" with the shaft 13. The transverse bar forms the guide means 16. The complementary guide means are formed by rails 8a or 8b.

Each side of the transverse bar 16 engages with a rail 8a or 8b, the transverse bar 16 being located between these rails 8a or 8b. The rails 8a, 8b can be "L"-shaped, the vertical arms preventing the transverse bar 16 from moving transversely and the horizontal arms preventing the transverse bar 16 from moving vertically. Thus, the transverse bar 16 slides in a preferred direction toward the front.

Figure 3:
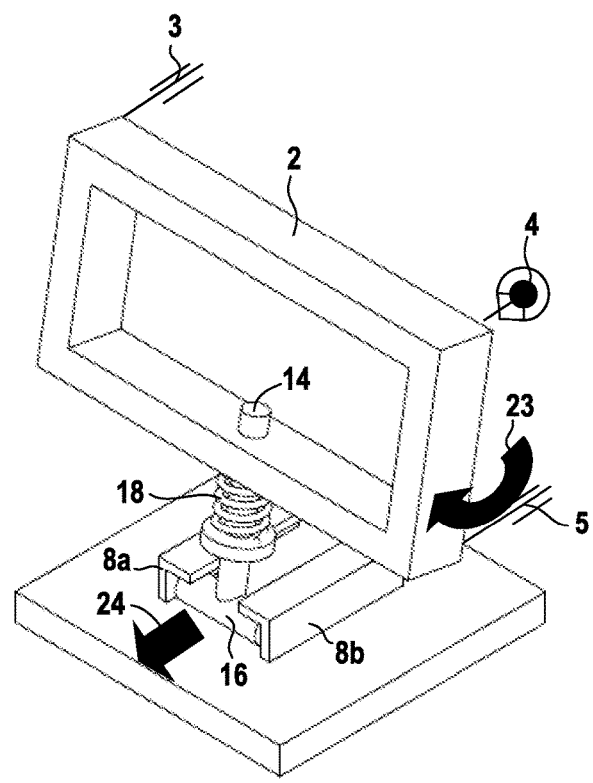
FIG. 3 is a perspective view of the component according to the invention, in a second state.
Figure 4:
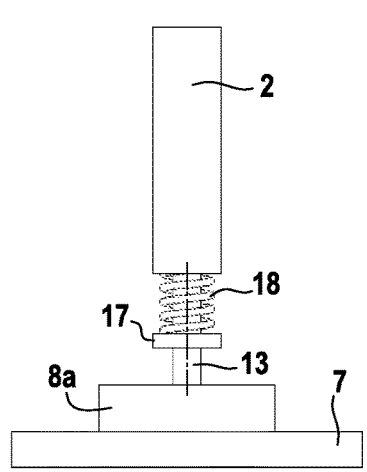
FIGS. 4 and 5 show a side view of FIGS. 1 and 3, respectively.

The mounting plate 2 specifically has three fastening points: one fixed point 4 and two movable points or fastening means 3 and 5. The design of a mounting plate 2 with three fastening means 3, 4, 5 is known. The movement 20 of the bottom movable point 5, under the fixed point 4, will cause the mounting plate 2 to tilt downward toward the front of the lighting device, as illustrated in FIG. 1. This causes the mounting plate 2 to rotate horizontally 23, as illustrated in FIG. 3. This is effected in particular during adjustment of the cutoff height, for example when the optical module generates a low beam. The design according to the invention allows the bearing surface 11 to slide, thereby making it possible to have additional support without preventing this adjustment, while making it easier to guide in a preferred direction 24 corresponding to the downward direction of movement of the mounting plate 2.

In addition, the presence of the damper 6 will make it possible to absorb the variations in load on the mounting plate 2 and its bearing element 10. These vibrations are significant on account of the weight of an optical module. Specifically, as illustrated in FIGS. 9 and 10, the latter can be fairly heavy. In the example illustrated, it comprises a reflector R and a lens L that is connected to the latter by a lens holder. It may also comprise motors for actuating the shields or the movement of the module about a vertical axis. It can be seen here that the vertical vibrations will cause significant variations in load on the module, on the mounting plate 2, and on the bearing surface 11. The damper 6 will make it possible to damp these variations in load.

In addition, the transverse bar 16 should have a clearance with respect to the horizontal portions of the rails 8a and 8b in order to be able to slide. The movements of the optical module as a result of braking or of a poor road surface could result in movements and jolts of the transverse bar 16 counter to these horizontal portions or counter to the housing bottom 7. The damper 6 makes it possible to damp these jolts.

It may be advantageous for the damper 6 to comprise an elastic means 18 that is able to deform when the mounting plate 2 tends to move toward or away from the bearing surface 11 under the effect in particular of these vibrations.

The elastic means 18 may be mounted in a preloaded manner. Thus, it will maintain permanent contact between the bearing surface 11 and the housing bottom 7, in spite of certain vibrations. Even if the variation in load is sufficient for the bearing surface 11 to lose contact with the housing bottom 7, this movement will nevertheless be absorbed and the vibrations will be reduced.

In the example illustrated, the elastic means is a coil spring 18.

The damper 6 comprises two elements that slide one in the other. The first is a bottom transverse arm 2a of the mounting plate 2 and is thus secured to the mounting plate 2. The second is the shaft 13 of the bearing element 10. The coil spring 18 is arranged between this bottom transverse arm 2a and a bearing 17 carried by this shaft 13. The coil spring 18 can thus be compressed or expanded by the movement of the shaft 13 with respect to the mounting plate 2.

According to the embodiment illustrated, the bottom transverse arm 2a comprises an orifice 2b, the shaft 13 passing through the orifice 2b. Thus, the bottom transverse arm 2a of the mounting plate, the shaft 13 with its bearing 17, and the coil spring 18 form the damper 6. The bearing element 10 and the damper 6 thus have common components, thereby reducing the space requirement and the number of components. In order to gain compactness, the turns of the coil spring 18 surround the shaft 13. In addition, the shaft 13 also makes it possible to guide the coil spring 18 in order that it can be compressed in a rectilinear manner.

In a simple manner, the coil spring 18 is secured on one side to the bearing surface 11 by bearing on one side against the bearing and on the other by bearing against the bottom transverse arm 2a.

This embodiment is not limiting. It is possible for example to have a piston system connecting the transverse arm 2a without passing through the latter.

Figure 5:
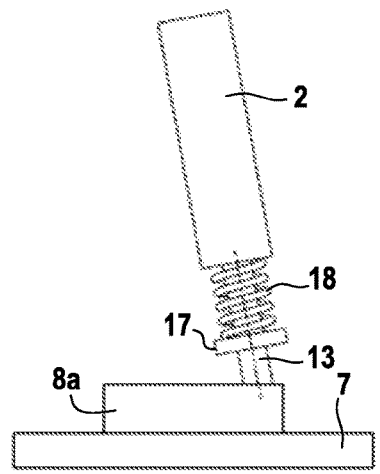

As can be seen in FIG. 5, during the downward movement of the mounting plate 2 toward the front, the shaft 13 can slide through the bottom transverse arm 2a of the mounting plate 2. The portion of the shaft 13 below this arm 2a thus increases; the portion 14 located above decreases. This aids the maintaining of contact between the bearing surface 11 and the housing bottom 7. Since the coil spring 18 is preloaded, it reinforces this maintaining of contact.

The transverse bar 16 of the bearing element 10 is cylindrical in this example, with a circular directrix. The axis of the cylinder, and thus the generatrices thereof, are perpendicular to the axis of the shaft 13. These two axes are shown in a dot-dashed manner in FIG. 2. As a result, the transverse bar 16 is only in contact with the housing bottom 7 along a line which is moreover transverse with respect to the preferred direction 24. Sliding is thus made easier.

Figure 6:
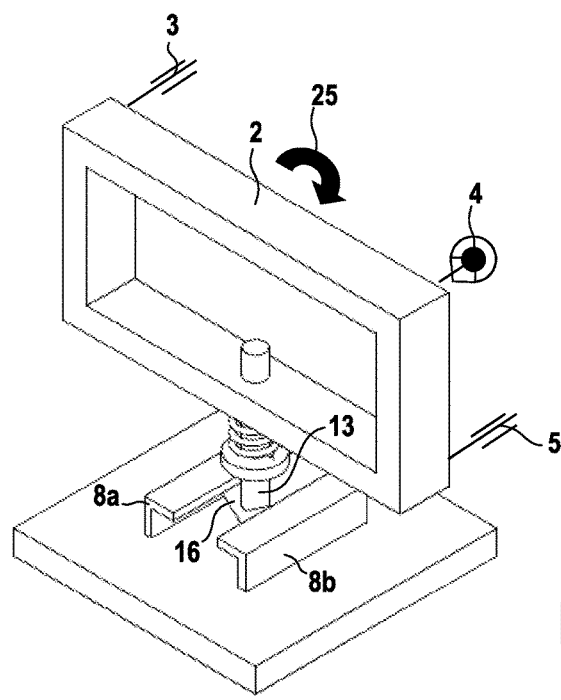
FIG. 6 is a perspective view of the component according to the invention, in a third state.
Figure 7:
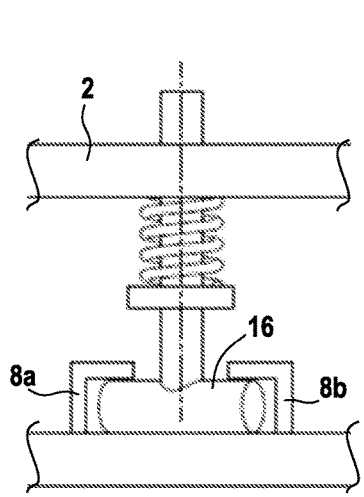
FIG. 7 shows an enlarged front view of a part of FIG. 6, in particular of the damper.

As can be seen in FIGS. 6 and 7, the actuation of the top movable point or fastening means 3 of the mounting plate 2 in the back and forth direction 22 will cause the corresponding vertical arm of the mounting plate 2 to tilt, thereby causing the mounting plate 2 to rotate horizontally 25, namely about a vertical axis passing through the fixed fastening point 4 and the other fastening point 5. Such actuation is effected in order to adjust the light beam to the right or the left. Since a clearance is provided between the free ends of the transverse bar 16 and the rails 8a and 8b, the transverse bar 16 risks also turning and being oriented in a manner that is less optimal for sliding and also increases the clearance between these free ends and the rails 8a and 8b. This offset is illustrated in FIGS. 6 and 7.

In order to improve this, the transverse bar 16 can be produced with two elements that slide one 32 in the other 37, an additional elastic means 34 being arranged between two parts of these elements 32 and 37 so as to deform as a result of the movement of these elements 32 and 37 with respect to one another.

Figure 8:
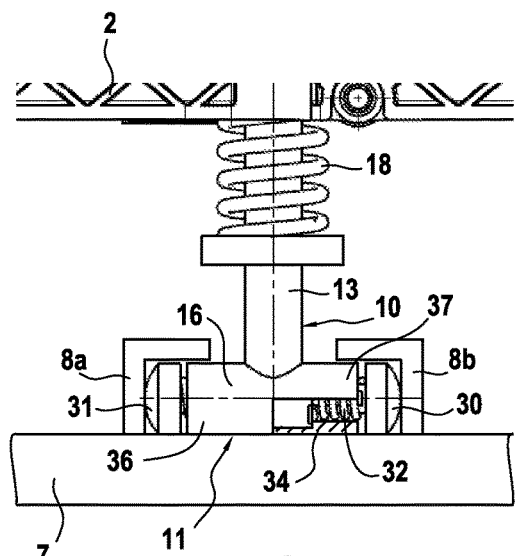
FIG. 8 shows an embodiment of the damper according to the invention.

FIG. 8 shows this improvement in detail. The transverse bar 16 comprises two sleeves 36, 37, one on each side of the shaft 13, each sleeve 36, 37 having a cylindrical through-orifice and also two slides 32 that each slide inside the sleeve. Each slide 32 bears a head 30, 31 outside the sleeve 36, 37. Each head 30 and 31 engages with one of the rails, 8a and 8b, respectively. An additional elastic means 34, in this example an additional coil spring, is connected on one side to the head 30 and on the other to the sleeve 37. Although not illustrated, the same elastic means 34 is provided for the sleeve 36 and the head 31.

The additional coil springs 34, the sleeves 36, 37 and their heads 30, 31 will form additional dampers for damping variations in load not from top to bottom, as for the coil spring 18, but from right to left. This will thus damp or absorb lateral vibrations.

In addition, the additional springs are preferably preloaded and will thus make it possible to maintain contact between the head 30, 31 and the vertical walls of the rails 8b, 8a. In addition, by maintaining contact, this allows the transverse bar 16 to avoid turning. Thus, the transverse bar 16 will remain oriented transversely, preferably perpendicularly, to the preferred direction 24.

The slide 32 has in this case the form of a rod, the additional springs 34 being wound around the latter inside the sleeve 37. The transverse bar 16 can thus be produced in a fairly compact manner. This also makes it possible to have rails 8a and 8b with a limited height.

This type of damper 6 and bearing element 10 can be applied to different components of lighting devices.

As explained above and illustrated in detail in FIGS. 9 and 10, it can be applied to a mounting plate 2 for supporting an optical module. The optical module is mounted on a component according to the invention, comprising the mounting plate 2 for supporting the module and the bearing element 10.

In these FIGS. 9 and 10, the optical module is an elliptical module comprising an elliptical reflector R connected by a lens holder to a thick convergent lens L. In this case, a light source S is mounted on the reflector R. It also comprises a mechanism M for actuating a shield (not shown) including the shield and a motor. Provision may be made, as in this example, of an actuator A for actuating the module in order to turn it with respect to the mounting plate 2, and thus to realize a function of following bends. It can be seen that such a module is heavy. The invention is particularly useful for damping variations in load to which it will be subjected.

In a general manner, the invention is even more useful if this mounting plate 2 bears a number of modules. It is furthermore possible to use a number of bearing elements 10 and dampers 6 according to the invention.

It is also useful in the context of LED optical modules. The LEDs for lighting are mounted on radiators which add even more weight to the optical module.

By absorbing the vibrations, not only does the invention make it possible to extend the service life of the fastening means 3, 4 and 5 for fastening the mounting plate 2, it also makes it possible to improve the stability of cutoff in the beam.

As illustrated in FIGS. 9 and 10, the optical module L, R is fitted on the portion 14 of the shaft 13 protruding from the transverse arm 2a. The transverse arm 2a of the mounting plate 2 forms a bearing of the mounting plate 2, on which bearing the module can rotate about the shaft 13 of the bearing element 10. Rotation occurs with respect to the mounting plate 2. Thus, not only does the shaft 13 form the shaft 13 that transmits the weight of the mounting plate 2 to the bearing surface 11 and is an element of the damper 6, it is also the shaft for rotating the module with respect to the mounting plate 2. This embodiment is compact and economical in terms of the number of components. This makes it possible to simplify the integration of the invention with a module for following bends, also referred to as a DBL ("Dynamic Bending Light") module.

Figure 11:
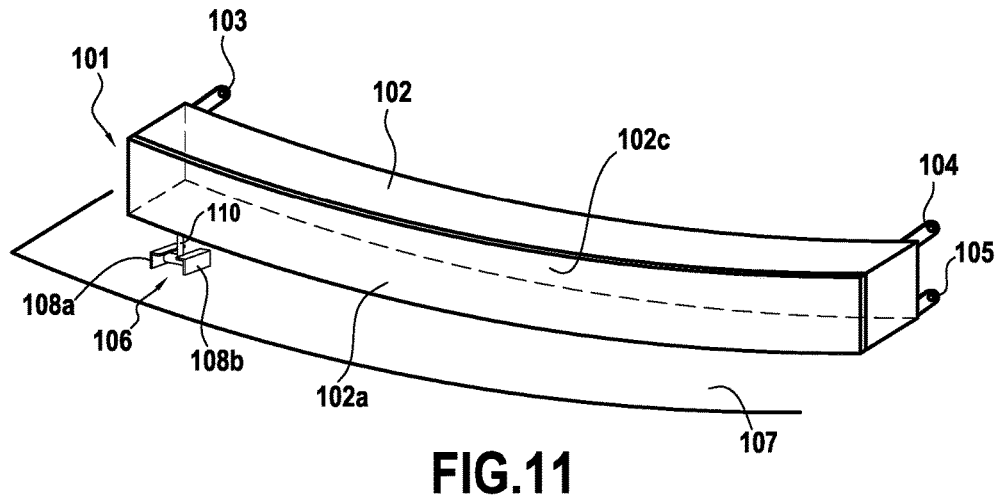
FIG. 11 shows another embodiment according to the invention.

However, the invention can also be applied to a housing 102 of a lighting device, in particular a high mounted stop light, as illustrated in FIG. 11. The housing 102 is closed by a transparent outer lens 102c, thereby defining a chamber. The chamber contains light sources and the optical means for generating the stop light beam. The housing 102 also comprises a bearing element 110 according to the invention, fixed to the bottom 102a of the housing 102 and outside the chamber.

All of the features of the invention can be applied to this embodiment. Nevertheless, in order to simplify the production of this housing 102, it is preferable for the shaft 13 of the bearing element 10 not to pass through the bottom 102a of the housing 102. This makes it possible not to have to provide sealing at this point. For example, provision can be made outside the chamber of an arm which is carried by the housing 102 and inside which the shaft 13 slides, or else a system of the cylinder body and piston type.

In this embodiment, the transverse bar 16 of the bearing element 110 engages with rails 108a and 108b that are carried by a bodywork element 107 or trim element thereof. Thus, a damper 106 is produced between the bottom 102a of the housing 102 of the high mounted stop light and the bodywork of the vehicle. The housing 102, the bearing element 110 and the damper 106 thus form one embodiment of a component according to the invention. This makes it possible to damp variations in load, in particular at the ends of the high mounted stop light, which has a significant length, sometimes a quarter to half the width of the rear window of the vehicle. Thus, excessively rapid wear to the fasteners 103, 104 and 105 of this light is avoided.

The bearing element 110 remains able to move with respect to the support 107. This mobility is necessary, since on account of its length, the fastening of the high mounted stop light involves adjustments to each of the fastening points 103, 104 and 105. The fact that the direction of mobility is preferred makes it possible to aid positioning. In addition, this preferred direction, when it is oriented in the longitudinal direction, makes it possible to preserve the orientation of the light.

Figure 12:
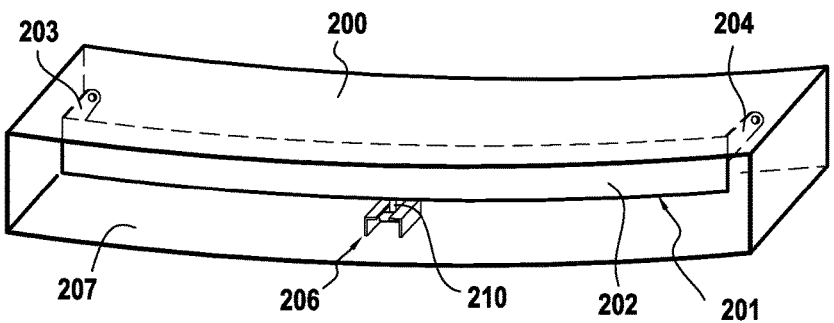
FIG. 12 shows yet another embodiment according to the invention.

As illustrated in FIG. 12, the invention can also be applied to a screen 202 made of a transparent and/or translucent material. This is even more advantageous when the screen 202 is heavy or very long. This is for example the case in a high mounted stop light. In FIG. 12, the high mounted stop light comprises a housing 200 that is closed by a closing outer lens (not shown). A chamber is thus defined. Located inside the latter is at least one light source and a screen 202 that is fastened to the housing 102 by fastening points 203 and 204. A bearing element 210 supports the weight of this screen 202, bearing against the housing bottom 207 and inside the chamber. Designed like the above embodiments, the bearing element 210 is joined to a damper 206 for damping the movement that moves the screen 202 toward or away from the housing bottom 207. The screen 202, the bearing element 210 and the damper 206 thus form one embodiment of a component according to the invention.

The presence of rails on this housing bottom 207 will make it possible, according to the principles of the invention, to guide the movement of the bearing surface in at least one preferred direction.

The embodiments in FIGS. 11 and 12 can be combined.

Figure 13:
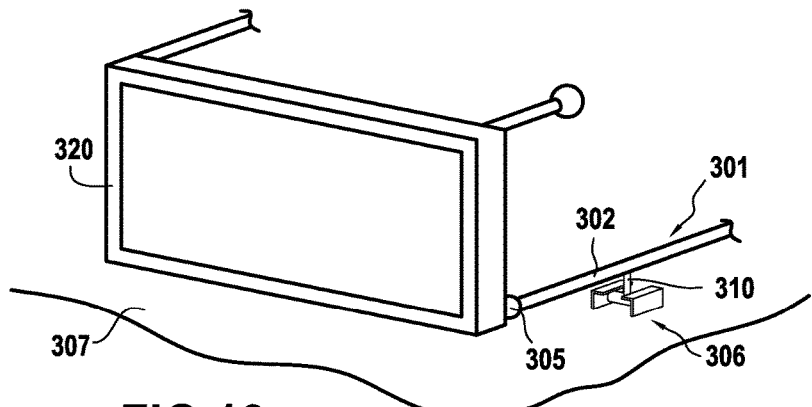
FIG. 13 shows yet another embodiment according to the invention.

According to another embodiment that is illustrated in FIG. 13, the invention can be applied to an adjusting rod that is highly offset in a housing. FIG. 13 shows the inside of a headlamp comprising:
- a housing 307,
- a mounting plate 340 for supporting an optical module,
- a component 301 according to the invention, in which the component body is an adjusting rod 302 comprising at one end a fastening point 305 for fastening to the mounting plate 340 and at the other a fastening point (not shown) for fastening to the housing 307 of the lighting device.

This rod 302 is highly offset on account of the depth of the housing 307. At the rear of the latter, means for actuating the rod 302 from the outside are provided. On account of its length, the rod 302 can also be subjected to significant excursions and vibrations. This rod 302 should also be able to move in the adjusting direction, in this case toward the front. The rod 302 is equipped with a bearing element 310 and a damper 306 so as to form a component 301 according to the invention.

The adjusting rod 302 thus bears against the housing bottom 307 via its bearing surface. The rails are arranged in the adjusting direction thereby allowing the rod 302 to move for the purpose of adjustment. The damper 306 damps the movement that moves the rod 302 toward or away from the housing bottom 307.

The bearing element 310 and the damper 306 are positioned at the location where the loads are greatest, for example toward the middle of the rod and/or toward the mounting plate.

This embodiment can be combined with the one in FIGS. 9 and 10.

The invention is thus particularly advantageous for damping the vibrations of a lighting device component, whether this be a component inside the lighting device or its housing 307 with respect to the vehicle. It is advantageous in particular when the bearing element 310 is intended to have a clearance in a complementary guide component.

Thus, in a general manner, the invention covers a motor vehicle lighting device comprising a component or assembly according to the invention. These lighting devices can be front headlamps, high mounted rear lamps, or devices for illuminating the interior of the passenger compartment, such as dome lights.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A vehicle lighting device component comprising:
   a component body comprising at least one fastening means for fastening said component body;
   a bearing element secured to said component body, separate from said at least one fastening means, and comprises a bearing surface, said vehicle lighting device component being intended to bear against said bearing surface when it is fasted by way of said at least one fastening means, and said bearing element and said component body being designed such that said bearing surface is able to move with respect to said component body;
   a damper positioned in operative relation to said component body to be able to damp a movement of said component body, this movement of said component body tending to move it toward or away from said bearing surface;
   wherein said vehicle lighting device component body comprises guide means that is able to guide the movement of said vehicle lighting device component body in at least one preferred direction.

2. The vehicle lighting device component according to claim 1, wherein said damper comprises at least one elastic means that is able to deform when said component body tends to move toward or away from said bearing surface.

3. The vehicle lighting device component according to claim 2, wherein said at least one elastic means is a spring.

4. The vehicle lighting device component according to claim 2,
   wherein said damper comprises two elements that slide one in the other, one being secured to said component body and the other being secured to said bearing element, said at least one elastic means being arranged between two parts of these elements so as to deform as a result of the movement of these elements with respect to one another when said component body tends to move toward or away from said bearing surface.

5. The vehicle lighting device component according to claim 4, wherein said element secured to said bearing element is a shaft and said element secured to said component body comprises an orifice, said shaft passing through said orifice, said at least one elastic means being fastened on one side to said shaft and on the other to said component body so as to deform when said shaft moves through said orifice.

6. The vehicle lighting device component according to claim 5, wherein said bearing element comprises said shaft, the latter being connected to said bearing surface and to said component body.

7. The vehicle lighting device component according to claim 5, wherein said orifice is formed in a part of said component body.

8. The vehicle lighting device component according to claim 5, wherein said bearing element comprises a transverse portion that bears said bearing surface and is fastened to one end of said shaft, a transverse portion protruding from each side of said shaft so as to be able to engage with a rail or slideway.

9. The vehicle lighting device component according to claim 8, wherein said transverse portion is cylindrical, an axis of the cylinder being perpendicular to that of said shaft.

10. The vehicle lighting device component according to claim 8, wherein said transverse portion comprises two elements which slide one in the other, one being connected to said shaft and the other being free, an additional elastic means being arranged between two parts of these elements so as to deform as a result of the movement of these elements with respect to one another.

11. The vehicle lighting device component according to claim 10, wherein said transverse portion comprises:
    a sleeve having a transverse cylindrical orifice;
    a slide sliding inside said sleeve;
    a head fastened to the end of said slide and outside said sleeve;
    an additional elastic means connected on one side to said head and on the other to said sleeve.

12. The vehicle lighting device component according to claim 1, wherein said component body is a mounting plate for supporting at least one optical module (L, R).

13. An assembly comprising at least one optical module (L, R) mounted on said vehicle lighting device component according to claim 5, said component body being a mounting plate for supporting said at least one optical module, wherein:
    said element secured to said component body and comprising an orifice is a bearing for said mounting plate;
    said shaft has a first end connected to said bearing surface and a second end, said first and second ends being located on either side of said orifice; and
    said optical module (L, R) is mounted so as to rotate on said second end of said shaft such that said optical module (L, R) can turn about said shaft with respect to said mounting plate.

14. The vehicle lighting device component according to claim 1, wherein said component body is a housing for a vehicle lighting device, in particular a high mounted stop light, said housing being intended to be closed by a transparent outer lens in order thus to define a chamber, said bearing element being outside said chamber.

15. A vehicle lighting device component comprising:
    a component body comprising at least one fastening means for fastening said component body;
    a bearing element secured to said component body, separate from said at least one fastening means, and comprises a bearing surface, said vehicle lighting device component being intended to bear against said bearing surface when it is fasted by way of said at least one fastening means, and said bearing element and said component body being designed such that said bearing surface is able to move with respect to said component body;
    a damper positioned in operative relation to said component body to be able to damp a movement of said component body, this movement of said component body tending to move it toward or away from said bearing surface;
    wherein said damper is secured on one side to said bearing surface and on the other to said component body.

16. A lighting device comprising:
    a housing closed by a transparent outer lens and thus defining a chamber;
    a vehicle lighting device component comprising at least one of a vehicle lighting device or an assembly, said vehicle lighting device comprising:

a component body comprising at least one fastening means for fastening said component body;

a bearing element secured to said component body, separate from said at least one fastening means, and comprising a bearing surface, said component body being intended to bear against said bearing surface when it is fastened by way of said at least one fastening means, and said bearing element and said component body being designed such that said bearing surface is able to move with respect to said component body, a damper positioned in operative relation to be able to damp a movement of said component body, this movement of said component body tending to move it toward or away from said bearing surface; said assembly being inside said chamber, said vehicle lighting device component comprising a guide means that is able to guide the movement of said vehicle lighting device component in at least one preferred direction;

wherein said housing comprises a complementary guide means which is complementary to said guide means for said vehicle lighting device component and is designed to allow said vehicle lighting device component to move in said at least one preferred direction.

17. The lighting device according to claim 16, wherein said complementary guide means is a slideway inside which said complementary guide means for said vehicle lighting device component is mounted and is able to slide in the preferred direction therein.

* * * * *